US008820107B2

(12) United States Patent
Parent

(10) Patent No.: US 8,820,107 B2
(45) Date of Patent: Sep. 2, 2014

(54) MACHINE FOR PRODUCING WATER FOR WIND ENERGY

(76) Inventor: Marc Hugues Parent, Ste Tulle (FR)

(*) Notice: Subject to any disclaimer, the term of this patent is extended or adjusted under 35 U.S.C. 154(b) by 339 days.

(21) Appl. No.: 12/095,324

(22) PCT Filed: Nov. 28, 2006

(86) PCT No.: PCT/FR2006/002602
§ 371 (c)(1),
(2), (4) Date: May 29, 2008

(87) PCT Pub. No.: WO2007/063208
PCT Pub. Date: Jun. 7, 2007

(65) Prior Publication Data
US 2008/0289352 A1 Nov. 27, 2008

(51) Int. Cl.
*F25D 21/14* (2006.01)
*E03B 3/28* (2006.01)
*F03D 9/02* (2006.01)
*F03D 9/00* (2006.01)
*B01D 53/26* (2006.01)

(52) U.S. Cl.
CPC .............. *E03B 3/28* (2013.01); *F05B 2260/20* (2013.01); *F03D 9/021* (2013.01); *Y02E 10/725* (2013.01); *F03D 9/00* (2013.01); *B01D 53/26* (2013.01)
USPC .......................................................... 62/291

(58) Field of Classification Search
CPC ........... F03D 9/00; B01D 53/265; E03B 3/28; Y02E 10/70; Y02E 10/726
USPC .................... 62/236, 284–291, 93, 641.1, 150
See application file for complete search history.

(56) References Cited

U.S. PATENT DOCUMENTS

| | | | | |
|---|---|---|---|---|
| 2,761,292 A | * | 9/1956 | Coanda et al. | 62/260 |
| 3,678,697 A | * | 7/1972 | Anderson | 62/274 |
| 3,752,395 A | * | 8/1973 | Ashikian | 237/46 |
| 3,984,224 A | * | 10/1976 | Dawkins | 62/89 |
| 4,015,962 A | * | 4/1977 | Tompkins | 62/175 |
| 4,433,552 A | * | 2/1984 | Smith | 62/93 |
| 4,712,382 A | * | 12/1987 | LeClear | 62/150 |
| 4,950,316 A | * | 8/1990 | Harris | 55/434.2 |
| 5,245,834 A | * | 9/1993 | Choi | 62/150 |
| 5,301,516 A | * | 4/1994 | Poindexter | 62/126 |
| 5,884,495 A | * | 3/1999 | Powell et al. | 62/150 |

(Continued)

FOREIGN PATENT DOCUMENTS

| | | | | |
|---|---|---|---|---|
| EP | 1510768 | * | 3/2005 | F24F 3/153 |
| EP | 1510768 A1 | * | 3/2005 | F24F 3/153 |

(Continued)

*Primary Examiner* — Frantz Jules
*Assistant Examiner* — Emmanuel Duke
(74) *Attorney, Agent, or Firm* — Young & Thompson

(57) ABSTRACT

A wind machine for producing water by condensation, includes a wind rotor, an air-dehumidifying unit and at least one electric power generation unit, these being supported by a tower anchored in the ground, the dehumidifying unit including at least one refrigeration compressor, at least one condenser and at least one evaporator that are connected together by a refrigerant fluid circuit, incorporating a member for expanding the fluid, the machine furthermore including elements for recovering and storing condensed water vapor. The at least one electric power generation unit is mechanically coupled directly to the wind rotor via its rotation shaft. The wind machine includes a device for storing and recovering the electric power thus generated and a device for automatically controlling and regulating the dehumidifying unit.

16 Claims, 3 Drawing Sheets

(56) References Cited

U.S. PATENT DOCUMENTS

| | | | |
|---|---|---|---|
| 6,295,826 B1 * | 10/2001 | Lee | 62/244 |
| 6,308,521 B1 * | 10/2001 | Eylman | 62/93 |
| 6,588,225 B1 * | 7/2003 | Hodgson et al. | 62/285 |
| 6,798,082 B1 * | 9/2004 | Chen | 290/55 |
| 7,029,576 B2 | 4/2006 | Siegfriedsen | |
| 7,043,934 B2 | 5/2006 | Radermacher et al. | |
| 2002/0023445 A1 * | 2/2002 | Sul et al. | 62/188 |
| 2002/0078704 A1 * | 6/2002 | Stich | 62/310 |

FOREIGN PATENT DOCUMENTS

| | | | | |
|---|---|---|---|---|
| FR | 2 833 044 A | | 6/2003 | |
| FR | 2833044 | * | 6/2003 | B01D 53/26 |
| FR | 2833044 A1 | * | 6/2003 | B01D 53/26 |
| FR | 2833044 A1 | * | 6/2003 | F03D 9/00 |
| GB | 2 117 656 A | | 10/1983 | |
| JP | 2001-248938 | * | 9/2001 | F28B 29/00 |
| JP | 2004132573 | * | 4/2004 | F24F 11/04 |
| WO | 99/11927 A | | 3/1999 | |
| WO | 2004/099685 A1 | | 11/2004 | |

* cited by examiner

MACHINE FOR PRODUCING WATER FOR WIND ENERGY

The present invention relates to a machine for producing water by condensation of water vapor contained in the air using wind energy.

A machine of this type was described in French Patent Application FR 2 833 044 in the name of the applicant. The machine described in this document consists of a wind rotor driving a refrigerating compressor supplying a condenser and an evaporator in order to condense the water vapor contained in the air and recover it in the form of water, which is then stored and filtered for later use.

Document WO 2004/099685 A1 also describes a machine for producing water using wind energy which includes means for regulating the pressure of the refrigerant fluid based on the flow of this fluid in the evaporator as well as means for regulating the airflow entering the evaporator according to the optimal condensation temperature.

The machines described in the two documents referred to above allow freshwater to be produced by condensation of the water vapor contained in the air in a satisfactory manner and with a satisfactory energy efficiency in conditions of regular wind and hygrometry.

However, these machines can only operate when the wind, and thus the wind energy, are sufficient and constant enough to drive the wind machine and thus operate the compressor of the refrigerant machine supplying the evaporator of the refrigerant fluid to condense the steam contained in the air. On the other hand, an uneven wind will lead to the wind rotor slowing and even sometimes stopping, which disturbs the operation of the compressor and even causes it to stop. This then affects the condensation capacities of the machine insofar as the energy supplied to the compressor is too low to allow good compression of the refrigerant fluid circulating in a loop between the compressor and the evaporator.

Moreover, in temperate regions such as those encountered in Europe, temperature and hygroscopic conditions favorable to the production of water by condensation (FIG. 4) do not always coincide with satisfactory wind conditions for driving the wind rotor. In summer in particular, the air is relatively dry during the day, when the thermal winds blow as the sun warms up the air and the ground. Conversely, the air picks up moisture at night when the wind is no longer blowing.

This dependence of the water generating machines described in document FR-2833044-A1 and WO-2004/099685-A1 on the meteorological and hygrometric conditions is problematic, as it considerably burdens the output of these machines in energy terms but also their capacity to produce water.

The aim of the present invention is to solve the problems encountered on the water producing machines described previously.

In particular, the invention seeks to create a machine which produces water in a large and regular quantity, in a continuous manner, independently of the wind power available at that time when the conditions of temperature and relative humidity of the air are suitable for producing water by condensation.

The solution proposed by the present invention consists in providing a machine of the type described in document FR-2833044-A1 which has a wind rotor and an air-dehumidifying unit supported by a tower anchored on the ground and characterized in that it comprises at least a means for electricity generation coupled mechanically to the wind rotor and a device for storing and recovering the electric power thus generated, the said means for electricity generation and the said storing device being connected together and to the said dehumidifying unit so that it can continue to operate independently of the wind power available to drive the said rotor.

The machine according to the invention thus allows wind power to be converted into electric power in an advantageous manner, then stored to constitute a buffer energy store so that the dehumidifying unit continues to operate to produce water continuously over a period of at least 24 hours, even when there is insufficient wind to drive the wind rotor. Moreover, the machine according to the invention also allows differed use of the electric energy produced in order to allow the dehumidifying unit to operate when the air temperature and hygroscopic conditions are most favorable for the production of water.

Once the buffer store of electric power has been built up, the electric power produced by the wind generation means can be used either directly by the dehumidifying unit or stored in an initial phase and then returned to the dehumidifying unit in conditions allowing it to operate. This case may arise in particular when the electric power generated by the wind is greater than the electric power consumed by the dehumidifying unit. The excess electrical energy then produced can be used for purposes other than the production of water.

The machine according to the invention therefore allows greater flexibility of use and better energy-efficiency than machines known in the prior art in that it allows the conversion and storage of the available wind power in the form of electric energy and its use when the weather and hygrometric conditions are most favorable to the production of water so that the dehumidifying unit produces water continuously and smoothly.

In accordance with preferred characteristic of the invention, the said means for electricity generation is either an alternator or a generator as preferred.

According to another advantage, the said storing device comprises at least a storage battery and a DC/AC conversion device to supply the dehumidifying unit. As an alternative, the device for storing electric power according to the invention may consist of an electric system to which the said means of electric generation and the said dehumidifying unit of the machine are connected.

This will avoid the use of means for storing the electric power and simplify the installation and decrease its dimensions.

In accordance with another characteristic of the invention, the said electricity generation means and the said dehumidifying unit are installed preferably in a nacelle positioned at the upper end of the mast of the machine, the said wind rotor then forming an integral part of the said nacelle at its axis of rotation and in direct contact by these means with the electric generation means, which may for instance consist of a generator.

This type of nacelle will allow critical parts of the machine to be covered and protected against violent winds, inclement weather and any air-borne solid object. This will also allow the creation of a unit with a more aerodynamic profile at the upper end of the machine-supporting mast, thus making it less prone to disturbances and vibrations generated by the wind.

In a preferred embodiment, the said dehumidifying unit includes means for regulating the condensation pressure of the cooling fluid circulating between the said compressor, the said condenser and the said evaporator. This means for regulating the condensation pressure allow better control of the refrigerant fluid pressure in the condenser in order to compensate for variations in the air temperature entering the dehumidifying unit, and to maintain a pressure differential between the condenser and the evaporator allowing vaporization of the refrigerant fluid in the evaporator in order to condense the water vapor contained in the air.

In accordance with another characteristic of the invention, the machine also comprises an automatic device for controlling and regulating the dehumidifying unit. Such an automatic device advantageously includes means for measuring the temperature and the hygroscopy of the air together with means for automatic control of the dehumidifying unit, in particular the compressor, so that said dehumidifying unit is only activated when the temperature and hydroscopic conditions of the air are suitable for the production of water.

Various alternatives of the machine according to the invention have other characteristics for improving the size, the operation and/or the performances of the machine, among which the following can be mentioned in particular:

- the said dehumidifying unit comprises at least ventilation means placed preferably opposite the said condenser and being adapted to draw outside air into the said unit through the evaporator and to discharge this after the dehumidification onto the said condenser;
- the said means for recovering and storing the condensed water vapor include at least one header positioned under the said evaporator and at least one tank connected by pipes to the said collector;
- the said tank is positioned in the mast supporting the said wind rotor and the said dehumidifying unit;
- a device for filtering the water produced is planned upstream or downstream of the tank for storing the condensed water vapor,
- a system for filtering the air entering at the level of the said evaporator is planned, together with means for covering and/or closing the said evaporator in order to avoid any clogging of it when the machine is installed in arid, dusty or desert areas for instance;
- the nacelle is fitted at the upper end of the mast in a swivelling manner, the machine also including means for orienting the said nacelle;
- at least one rotating manifold is proposed between said nacelle and said mast so as to allow the circulation of dehumidifying unit towards the tank and/or the circulation of electric power between the electrical energy generation device contained in the nacelle and an electricity network or an additional storage device to which it is connected, and this from said network or said storage device towards the dehumidifying unit,
- a speed increaser gearing system or a gearbox is planned between the shaft of the wind rotor and the electric generation device so as to multiply the rotational speed of the wind rotor shaft in order to optimize electricity generation;
- an additional source of electric power is connected to the machine so as to supplement the electric power generated by the electric generation device when the wind power is low or insufficient to drive the wind rotor.
- the characteristics and advantages of the invention will be clearer on reading the detailed description of the invention which follows and which is non-limiting and refers to the appended figures among which:

Figure 1:
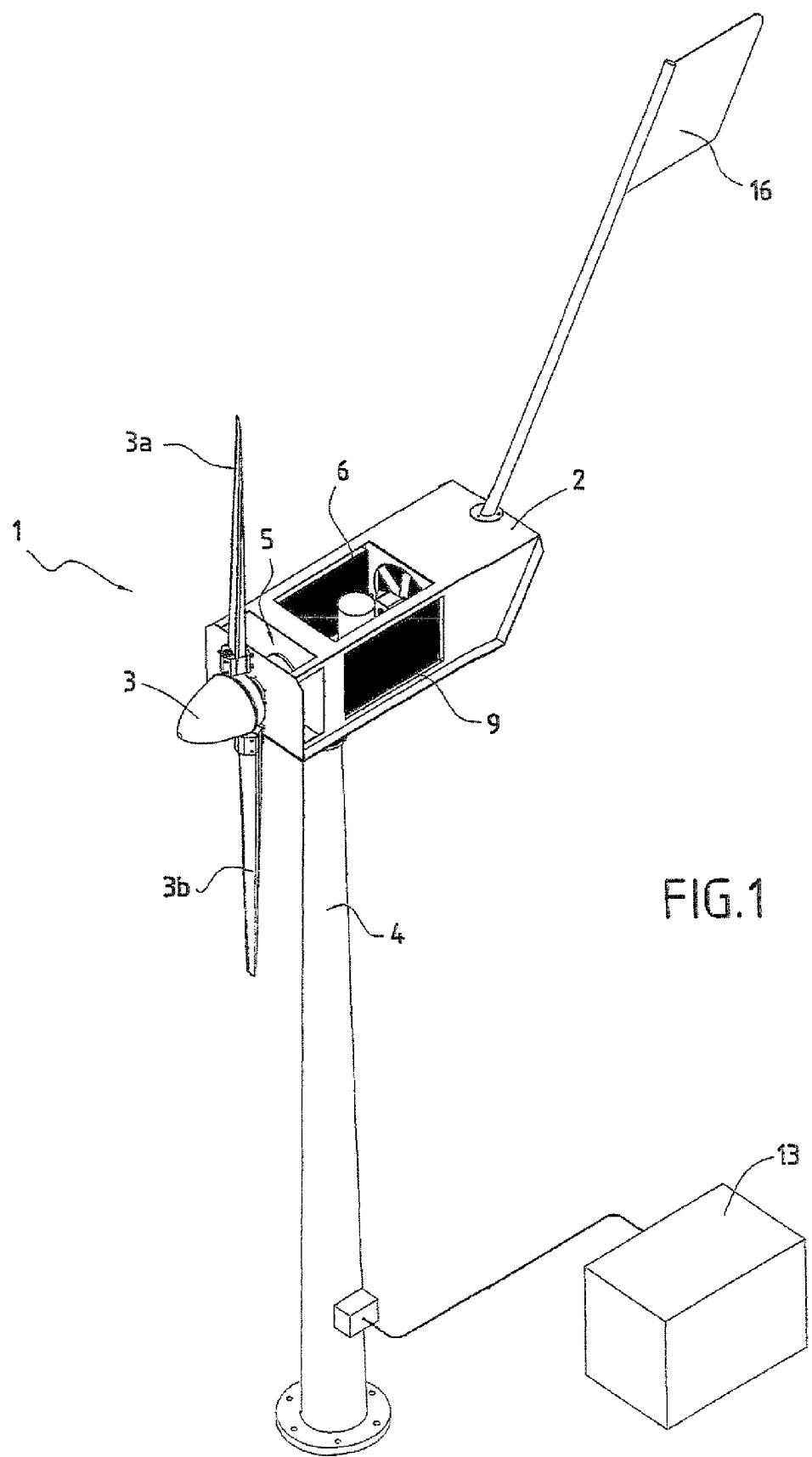
FIG. 1 is a perspective view of a machine conforming to the invention in a preferred embodiment.
Figure 2:
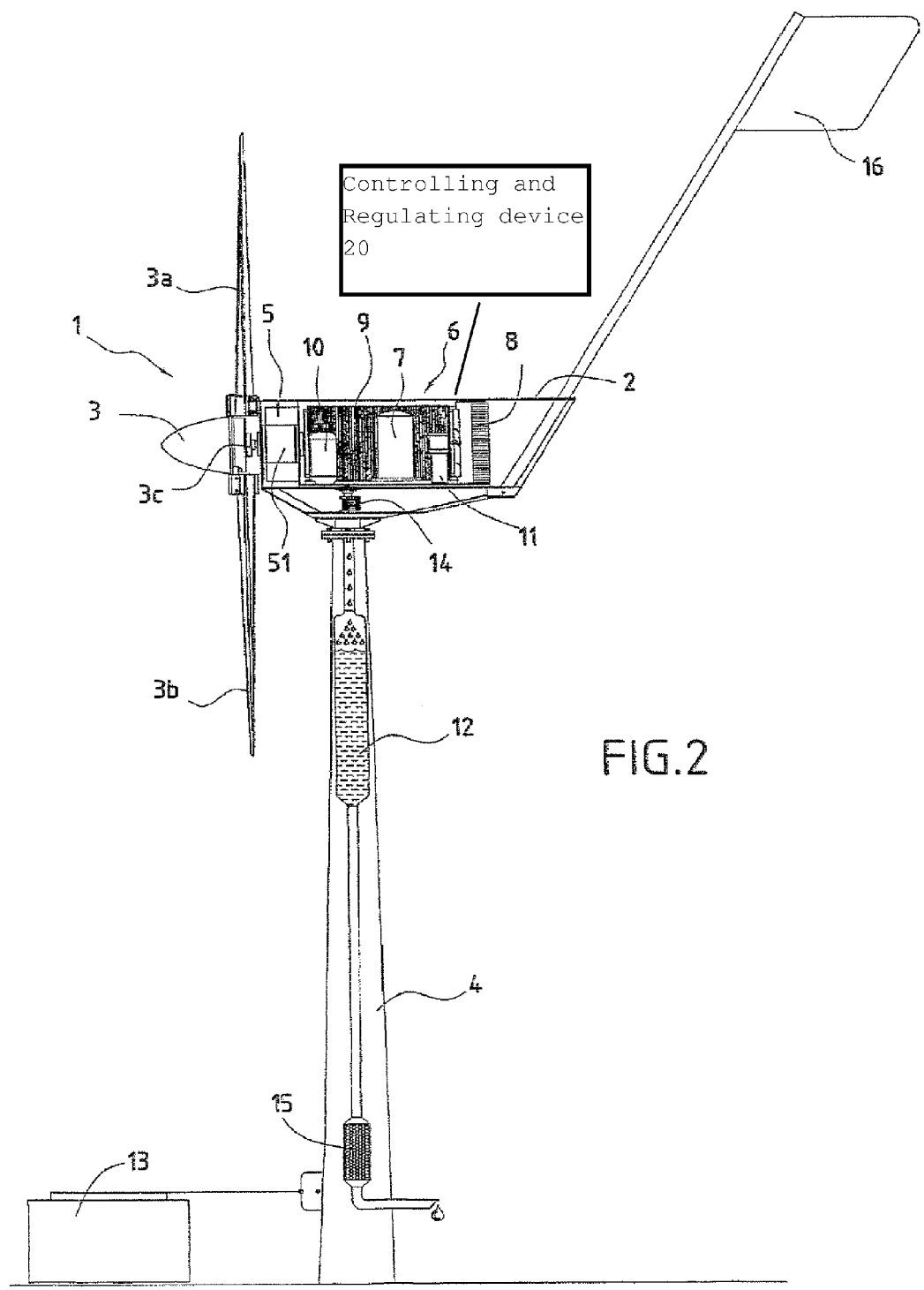
FIG. 2 shows a longitudinal section of the machine according to the invention.

By referring first of all to FIGS. 1 and 2, the water-producing machine according to the invention is, in the general embodiment shown, a wind machine consisting of a wind rotor 3 equipped with blades 3a, 3b, joined to a main shaft 3c by which said rotor 3 is fitted on a nacelle 2, itself installed at the upper end of a mast or tower 4, preferably in a swivelling arrangement.

Depending on the size of the wind rotor, nacelle tower 4 can be of lattice or, preferably, tubular construction.

Nacelle 2 encloses an electric generation device 5 and a dehumidifying unit 6 producing water by condensation of the water vapor contained in the air, the latter being supplied from the electricity produced by the former.

Electric generation device 5 is of conventional construction in the field of wind turbines. It includes at least one generator 51 (in practice this can be an alternator or a generator), coupled to main shaft 3c of the wind rotor in order to convert the wind power captured by blades 3a, 3b of the rotor into electricity. In a preferred arrangement, electric generation device 5 also comprised a gearing system (not shown) positioned between main shaft 3c or rotor 3 and generator 51, the said gearing system operating to accelerate the rotation speed of the main shaft up to a speed of around the nominal speed of generator 51 so that it operates with optimum efficiency.

Figure 3:
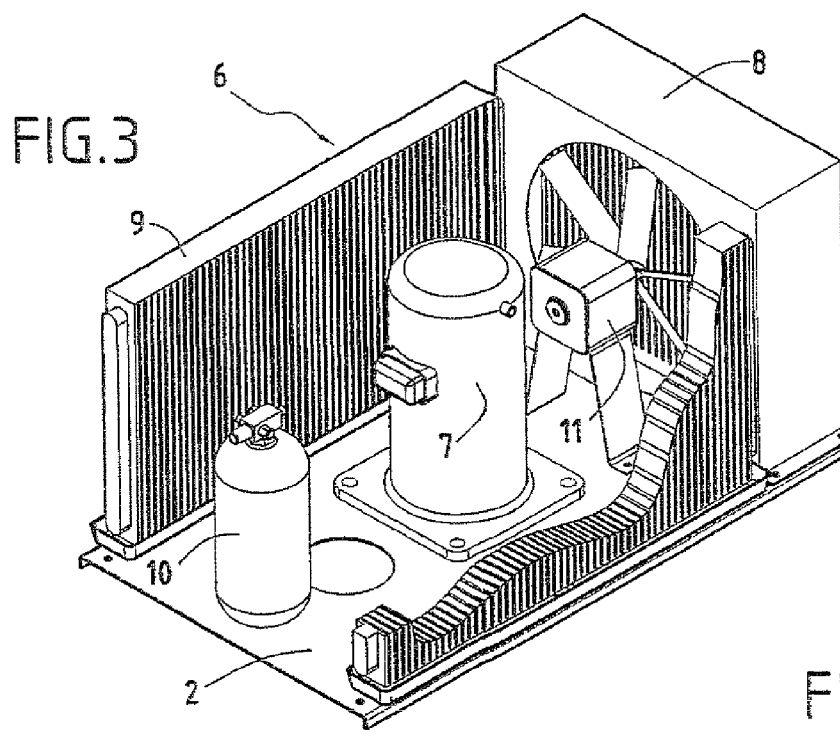
FIG. 3 shows a truncated perspective view of the dehumidifying module of the machines in FIGS. 1 and 2.

As shown in detail on FIG. 3, the dehumidifying unit is similar to a refrigerant machine. It consists of an electric compressor 7, a condenser 8 and two evaporators 9 connected to each other by a circuit (not shown) of refrigerant fluid kept in a tank 10, a system for expanding the refrigerant fluid such as a capillary or pressure reducing system being moreover inserted in a known way between the condenser and the evaporators to allow vaporization of the refrigerating fluid in evaporators 9.

In order to avoid clogging of the dehumidifying unit 6, it may moreover be worthwhile to provide means for the filtration of air at the level of said evaporators 9. Similarly, when the machine subject of the invention is installed in dry and even desert or coastal regions, it is preferable to covering and/or close evaporators 9 to avoid their the machine's deterioration by sand or sea salt-laden winds.

Dehumidifying unit 6 also includes a forced ventilation device 11 arranged opposite condenser 8. This ventilation device is assigned a dual role. Initially, it is used to create a depression inside the dehumidifying device 6 generation air suction from outside nacelle 2 towards the inside of dehumidifying device 6 through evaporators 9, thereby causing the dehumidification of the incoming air by condensation of the water vapor contained in the air on the evaporators, the condensate then running out by gravity towards means for recovering and storing the water. Secondly, another function of the said ventilation device is to cool condenser 8 by blowing on it the air drawn in so as to evacuate the heat exchanged between the air and the refrigerating fluid during condensation of the water vapor and released on compression of the fluid by compressor 7.

The dehumidifying unit comprises a system for regulating the condensation pressure (not shown on the figure). This controls the refrigerant fluid pressure in the condenser to compensate for the variations of the air temperature entering the evaporators so as to maintain the condenser and the evaporators at a differential pressure of refrigerating fluid sufficient to obtain the vaporization of the said fluid in the evaporators and allow condensation of the water vapor contained in the air.

To recover the condensate from evaporators 9, machines 1 is equipped with manifolds installed under the said evaporators in which the condensate flows by gravity and then is transferred by suitable means towards a storage tank 12 proposed for this purpose in tower 4. Such an arrangement of the storage tank in the tower of machine 1 is an additional advantage because it allows the pressure generated by cavity to be used to route the water from the tank to the various potential users at ground level. However, storage tank 12 can also be installed on the ground in a room or appropriate vessel to reduce and simplify the structure of machine 1. In addition to tank 12, it is also preferable to provide means 15 for filtering the water produced upstream and downstream in order to cleanse and if necessary purify it, and in particular to make it potable for supply and direct use by consumers.

In accordance with the invention, machine 1 also comprises a device 13 for storage and restitution of the electric power produced by generator 51. Storage device 13 is advantageously connected by appropriate connections to generator 51 and to dehumidifying unit 6, in particular to compressor 7 and ventilation device 11. This storage device 13 allows an electric power buffer store to be created thereby allowing the dehumidifying unit to operate independently from the wind power for a length of time which is determined during the period of water production chosen by the operator of machine 1.

Figure 4:
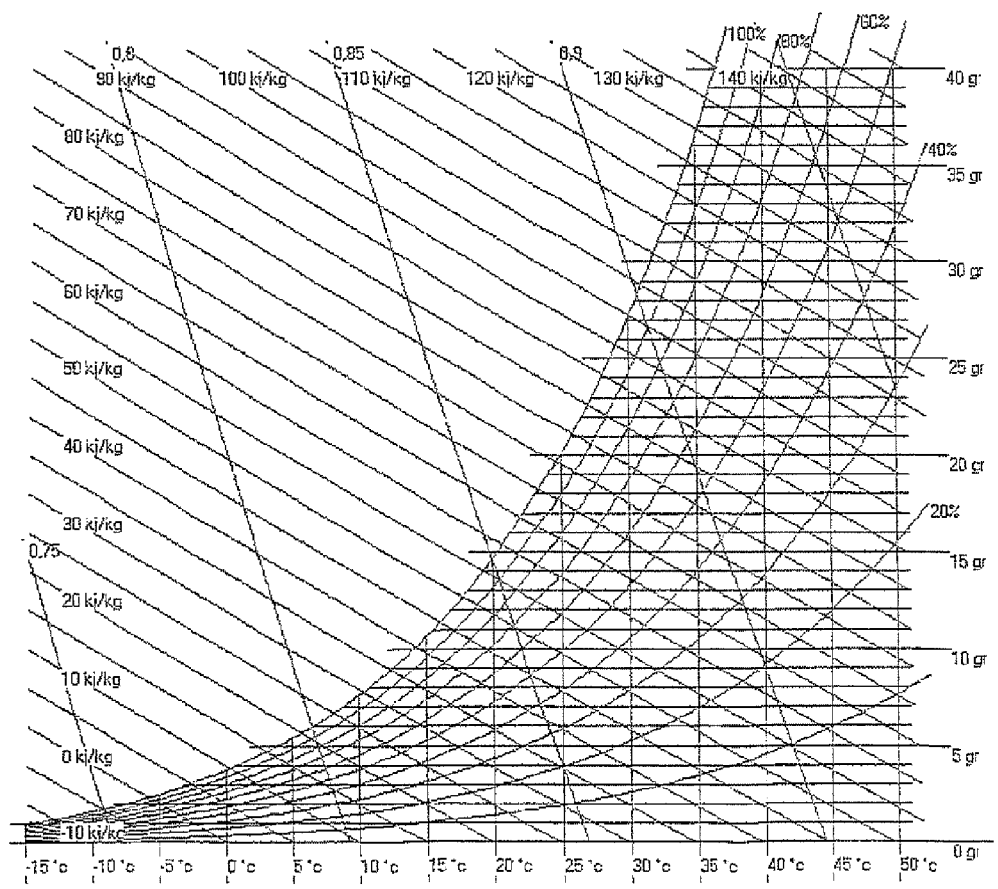
FIG. 4 is a psychometric diagram of damp air.

The creation of a buffer store of electric power also avoids spurious shutdowns of electric compressor 7 of dehumidifying unit 6 when the wind is intermittent, stops which affect the energy efficiency of the water producing wind machines known to the prior art. Another advantage of storage device 13 is that it allows periods of electric generation to be separated from periods of water production and thereby allows dehumidifying unit 6 to operate continuously at times of the day when the relative humidity and temperature parameters of the air (see FIG. 4) are most favorable for the production of water.

However, although conditions of water production and regular winds are encountered simultaneously, the dehumidifying unit can be fed directly with the electricity produced by generator 51 without having to store this electricity.

The device for storing and restituting electric power 13, shown diagrammatically on FIGS. 1 and 2, can consist in a first alternative embodiment of at least one storage battery able to store the electricity produced by the generator and restitute it through a converter in the form of AC current of the "mains" type corresponding to the country in which the device will be used (for instance 220V or 380V in France) directly usable by dehumidifying unit 6.

In a second alternative embodiment, storage device 13 can consist of an existing electricity supply system to which machine 1 is connected, in which case the storing of the electricity produced by generator 51 is not carried out physically, but by crediting the electric power produced by generator 51 directly to the said electricity system, this power credit being metered by an appropriate meter. Thereafter, the dehumidifying unit operates by discharging an output onto the electricity system that is equivalent to the credit metered beforehand (or less if appropriate).

Of course, it is also possible to envisage other devices for storing and restituting the electric power produced by generator 51, insofar as they have small overall size and allow simple and continuous storing and restitution of electric power.

In order to control the correct operation of electric generation device 5 and dehumidifying unit 6, the machine also includes in nacelle 2 an automatic controlling and regulating device 20 comprising a programmable logic controller or programmable computer controlling the operation of wind rotor 3 and generator 51 as well as dehumidifying unit 6, in particular compressor 7 and forced ventilation device 11. This pic is connected to an anemometer and temperature and hygroscopic sensors installed outside nacelle 2. Thus, rotor 3 and/or generator 51 as well as dehumidifying unit 6 can be started or stopped automatically as soon as the parameters measured by the said anemometer and said sensors are more than or less than the set points input on installation of machine 1. Of course these set point values can be modified at any time by an operator responsible for modifying the pic or computer program, or on machine maintenance operations.

As stated previously, nacelle 2 can be fitted to swivel at the upper end of tower 4, so that rotor 3 can be constantly positioned facing the wind. According to the dimensions of nacelle 2, various systems can be selected to allow this swiveling and orientation of the nacelle. A first orientation system, as shown on FIGS. 1 and 2, consists of a fin 16 fixed on nacelle 2 the latter being fixed on a pivot around a vertical axis common with tower 4. This type of orientation system is particularly appropriate for use on small and low power machines. For larger installations, the weight of the nacelle and the rotor become too high with the result that a fin has to be used to orient the machine to face the wind. In this case, a system can be installed consisting of a crown wheel placed on the upper end of the tower and an orientating motor-gearbox unit placed in or under the nacelle and driving a pinion gear meshing with the crown gear of tower 4 to cause rotation of the nacelle, the said motor-gearbox being controlled by the said device for controlling and regulating machine 1.

When nacelle 2 swivels in this way on tower 4, the routing of electricity from generator 51 to storage device 13 together with the condensate from dehumidifying unit 6 to the tank by conventional cables and pipes becomes problematic as the rotation of the nacelle can lead to cable twisting and rolling up, which can damage them. To overcome this, rotating manifolds 14 are proposed at the base of the nacelle to allow water and electricity to be routed towards their respective storage means 11, 13 without pipes or cables in the rotational plane of nacelle 2 on tower 4. If the machine is equipped with a high power generator, the rotating electric manifold is replaced by a system controlling the torsion in the electric cables, the said cables being used to transport the electric power.

In another alternative embodiment of the invention not shown, auxiliary energy sources, such as solar panels, power generating units, gas turbines can also be proposed to supplement or replace the wind power in periods of no or low wind in order to ensure the daily production of the minimum quantity of water.

Machine 1 of the invention allows great flexibility of use and guarantees daily production of water whatever the weather conditions, especially wind.

In practical terms, once the machine is installed on its production site and its operating parameters adjusted and recorded in the nacelle controlling and regulating device, operation is fully automated. The wind gauge on the nacelle constantly measures the force of the wind in the area and a wind vane indicates the direction, which in term determines the orientation of nacelle 2 so as to position rotor 3 facing the wind, either by actuating the orientation motor or by the effect of a fin, depending on the orientation device selected. Then, as soon as the force of the wind is sufficient to drive rotor 3, machine 1 creates first of all an electric power buffer store through generator 51, which produces electricity when driven by the rotor, this electricity being transported from generator 51 to storage device 13 and being metered to determine the available electric power.

Once the buffer store has been built up (which will roughly corresponded to the electric power required to operate the dehumidifying unit 6 for 12 or 24 hours at least), dehumidifying unit 6 can then be started automatically by the controlling and regulation device. This start-up is determined by measuring the temperature and hygroscopic parameters of the air, also automatically and continuously by the sensors on nacelle 2, parameters which determine the potentially condensable mass of water in the air as result from the psychometric diagram of humid air in FIG. 4.

If the atmospheric conditions allow simultaneous operation of dehumidifying unit 6 and electricity production by generator 51, the said dehumidifying unit 6 is supplied directly by the generator, the stored buffer energy being kept for later use in the event of a failure of the wind. If on the other hand, the temperature and hygroscopic conditions of the air are insufficient to produce a significant quantity of water, although the wind blows sufficiently to drive rotor 3 and produce electricity, this electric power will continue to accumulate in the storage device and, if necessary, the surplus is distributed for any other need or use such as with a conventional aerogenerator. Thereafter, once the conditions allowing the production of water are encountered the device for controlling and regulating machine 1 starts operation of dehumidifying unit 6, whether there is wind or not, the supply to the aforesaid unit being from the buffer energy stored beforehand, whether this storage device is a storage battery or an electricity transmitter.

Once dehumidifying unit 6 is operating, internal ventilation device 11 causes air to be drawn into nacelle 2 through evaporators 9, which are cooled by circulation of refrigerating fluid through refrigeration compressor 7 and condenser 8. Thus, when the water vapor comes into contact with the walls of evaporator 9, it condenses and runs out towards the recovery trays and a tank 12 in tower 4. The water can be dispatched by pipes from this tank to any point of consumption, preferably after being filtered 15 to render it potable and to eliminate any solid particles in suspension.

The invention claimed is:

1. A machine (1) for producing water by condensation, comprising:
   a wind rotor (3);
   an air-dehumidifying unit (6);
   means for recovering and storing condensed water vapor; and
   at least one electric power generation means (5, 51),
   the electric power generation means and said air-dehumidifying unit both installed inside a nacelle configured to be supported by a tower (4) anchored in the ground, and
   said air-dehumidifying unit comprised of
      at least one refrigeration compressor (7),
      a condenser (8), and
      first and second evaporators that are connected together by a refrigerant fluid circuit, incorporating a means for expanding said fluid, wherein said electric power generation means (5, 51) is mechanically coupled to said wind rotor,
   wherein said electric power generation means is connected to an electric power device (13) for storing and recovering electric power generated by said electric power generation means and a device for automatically controlling and regulating said air-dehumidifying unit (6), said electric power generation means and said electric power storage device being connected to said air-dehumidifying unit and to said device for controlling and regulating said air-dehumidifying unit, so that said air-dehumidifying unit and said device for controlling and regulating said air-dehumidifying unit are capable of operating continuously and independently of wind energy available for driving said rotor,
   wherein the air-dehumidifying unit has at least one forced ventilation device located opposite the condenser and adapted to create a depression inside the air-dehumidifying unit that draws air from outside the nacelle into the air-dehumidifying unit through the first and second evaporators, the forced ventilation device configured to discharge said air after dehumidification by blowing said air on the condenser, the forced ventilation device creating a stream of air coming from outside the nacelle and penetrating inside the nacelle through the first and second evaporators, said stream of air being evacuated outside the nacelle by being blown through the condenser by the forced ventilation device, the forced ventilation device being placed downstream of the first and second evaporators and upstream of the condenser,
   wherein the first and second evaporators form opposite facing walls of the nacelle separating the interior of the nacelle from the exterior of the nacelle, the first and second evaporators facing each other and both extending along opposite sides of a line that extends through the interior of the nacelle and collinear with an axis of rotation of the wind rotor,
   wherein the condenser forms a wall that is perpendicular to said line, and
   wherein the forced ventilation device is intersected by said line, the forced ventilation device having rotating blades that rotate around an axis of rotation co-linear with said line and collinear with the axis of rotation of the wind rotor.

2. The machine according to claim 1, wherein said electric power generation means comprise a generator (51).

3. The machine according to claim 1, wherein said electric power storage and recovery device (13) comprises at least one storage battery.

4. The machine according to claim 1, wherein said electric power storage device comprises an electric supply system, said electric energy generation means and said air-dehumidifying unit are connected to the electric supply system.

5. The machine according to claim 1, wherein said wind rotor (3) is joined to said nacelle by a rotation shaft (3c).

6. The machine according to claim 5, further comprising: means for orientating said nacelle, said nacelle being fitted to swivel on said tower.

7. The machine according to claim 6, further comprises at least one rotating manifold (14) between said nacelle (2) and said tower (4).

8. The machine according to claim 1, wherein said air-dehumidifying unit (6) regulates the condensation pressure of the refrigerant fluid circulating in said condenser (8).

9. The machine according to claim 1, wherein said means for recovery and storage of condensed water vapor comprises at least one manifold arranged under said first and second evaporators and at least one tank (12) connected to said manifold.

10. The machine according to claim 9, wherein said tank (12) is placed in the tower supporting said wind rotor (3) and said air-dehumidifying unit.

11. The machine according to claim 1, further comprising: a device for purifying (15) the water produced by said air-dehumidifying unit.

12. The machine according to claim 1, further comprising: an auxiliary electric power supply supplementing the electric power produced by the electric power generation device when the wind energy is low or insufficient to drive the wind rotor.

13. The machine according to claim 1, wherein the first and second evaporators form opposite exterior walls of the nacelle that are aligned with each other along the direction of the line collinear with the axis of rotation of the wind rotor.

14. The machine according to claim 1, wherein the condenser and the first and second evaporators respectively form three sides of a rectangular enclosure that delimits the interior the nacelle, the at least one refrigeration compressor being located within said enclosure.

15. A machine (1) for producing water by condensation, comprising:
 a wind rotor (3);
 an air-dehumidifying unit (6);
 means for recovering and storing condensed water vapor; and
 at least one electric power generation means (5, 51), the electric power generation means and the air-dehumidifying unit both installed inside a nacelle configured to be supported by a tower (4) anchored in the ground,
 said air-dehumidifying unit comprised of
   at least one refrigeration compressor (7),
   at least one condenser (8), and
   first and second evaporators that are connected together by a refrigerant fluid circuit, incorporating a means for expanding said fluid,
 wherein said electric power generation means (5, 51) is mechanically coupled to said wind rotor and said electric power generation means, and includes an electric power storage device (13) for storing and recovering the electric power generated by said electric power generation means, and a device for automatically controlling and regulating said air-dehumidifying unit (6) that is connected to the electric power storage means to be supplied at least temporarily with energy from the electric power storage means,
 said electric power generation means and said electric power storage device being connected together, to said air-dehumidifying unit, and to said device for controlling and regulating said air-dehumidifying unit, in order to allow said electric power generation means to operate continuously, independently of wind energy available for driving said rotor,
 wherein the air-dehumidifying unit has at least one forced ventilation device placed opposite the condenser and adapted to create a depression inside the air-dehumidifying unit in order to draw air from outside the nacelle into the air-dehumidifying unit through the first and second evaporators, and configured to discharge said air after dehumidification by blowing said air on the condenser, the forced ventilation device creating a stream of air coming from outside the nacelle and penetrating inside the nacelle through the first and second evaporators, said stream of air being evacuated outside the nacelle by being blown through the condenser by the forced ventilation device, the forced ventilation device being placed downstream of the first and second evaporators and upstream of the condenser,
 wherein the first and second evaporators are located at opposite sides of the nacelle and arranged so that respective inner faces of the first and second evaporators, both extending in a direction from a forward end of the nacelle to a rear end of the nacelle, are aligned with each other and face each other across an interior of the nacelle, respective outer faces of the first and second evaporators facing outward from the nacelle and exposed to an exterior of the nacelle the inner and outer faces of the first and second evaporators extending along opposite sides of a line that extends through the nacelle and is collinear with an axis of rotation of the wind rotor,
 wherein the condenser forms a wall that is perpendicular to said line, and
 wherein the forced ventilation device is intersected by said line, the forced ventilation device having rotating blades that rotate around an axis of rotation collinear with said line and co-linear with the axis of rotation of the wind rotor.

16. A machine (1) for producing water by condensation, comprising:
 a wind rotor (3);
 an air-dehumidifying unit (6);
 means for recovering and storing condensed water vapor; and
 at least one electric power generation means (5, 51), the electric power generation means and said air-dehumidifying unit both installed inside a nacelle configured to be supported by a tower (4) anchored in the ground, and
 said air-dehumidifying unit comprised of
   at least one refrigeration compressor (7),
   at least one condenser (8), and
   first and second evaporators that are connected together by a refrigerant fluid circuit, incorporating a means for expanding said fluid,
 wherein said electric power generation means (5, 51) is mechanically coupled to said wind rotor,
 wherein said electric power generation means is coupled to an electric power storage device (13) for storing and recovering the electric power generated by said electric power generation means, and to a device for automatically controlling and regulating said air-dehumidifying unit (6) configured to activate said air-dehumidifying unit only when an air temperature and humidity condition is adequate for producing water, said electric power generation means and said electric power storage device being connected together, to said air-dehumidifying unit, and to said device for controlling and regulating the latter, in order to allow said electric power generation means to operate continuously, independently of wind energy available for driving said rotor,
 wherein the air-dehumidifying unit has at least one forced ventilation device placed opposite the condenser and adapted to create a depression inside the air-dehumidifying unit in order to draw air from outside the nacelle into the air-dehumidifying unit through the first and second evaporators and configured to discharge this said air after dehumidification by blowing said air on the condenser, the forced ventilation device creating a stream of air coming from outside the nacelle and penetrating inside the nacelle through the first and second evaporators, said stream of air being evacuated outside the nacelle by being blown through the condenser by the forced ventilation device, the forced ventilation device being placed downstream of the first and second evaporators and upstream of the condenser,
 wherein the first and second evaporators each form a wall of the nacelle and separate the interior of the nacelle from the exterior of the nacelle, the first and second evaporators facing each other and extending along opposite sides of a line that extends through the nacelle and is collinear with an axis of rotation of the wind rotor,
 wherein the condenser forms a wall that is perpendicular to said line, and
 wherein the forced ventilation device is intersected by said line, the forced ventilation device having rotating blades that rotate around an axis of rotation collinear with said line and co-linear with the axis of rotation of the wind rotor.

\* \* \* \* \*